United States Patent Office 2,732,337
Patented Jan. 24, 1956

2,732,337

PHOTO-OXIDATION OF ERGOSTEROL

Rudolf E. Tögel, Vienna, Austria

No Drawing. Application September 29, 1954,
Serial No. 459,206

2 Claims. (Cl. 204—158)

This invention relates to an oxidation product of ergosterol and a process of making it; more particularly it relates to a composition useful in physiological chemistry which is obtained by oxidizing ergosterol with molecular oxygen and irradiating the oxidized product.

This application is a continuation-in-part of my co-pending application for Cyclopentanoperhydrophenanthrene Compound and Therapeutic Composition Containing It, Serial No. 169,064, filed June 19, 1950, now abandoned.

According to my invention, I dissolve ergosterol in ethanol, add a small amount of hematoporphyrin and bubble molecular oxygen through the solution while irradiating it with visible light from tungsten lamps and refluxing it at the boiling point of the solution. The resultant oxidized product is saponified, dissolved in ether and irradiated with ultra violet light from a quartz mercury lamp.

The composition of my invention may be employed in testing the potential ability of horse-serum to aminate fatty acids. The following examples of embodiments of my invention are intended to be illustrative only and not to limit the scope of my invention which is defined in the appended claims.

Example 1

Ergosterol (1 part) is dissolved in 100 parts ethanol (pure grain alcohol or commercial denatured EtOH G–1G). A solution of hematoporphyrin in pyridine (2 mg./ml., 2–20 mg. per gram of ergosterol) is added as a catalyst in small portions over a period of several hours while the mixture is refluxed and oxygen is bubbled through. Alternatively a 2.5 mg./ml. pyridine solution may be added all at once at the beginning of the reaction. The mixture is irradiated with visible light, three 100 watt tungsten lamps being used for runs of from 12–60 g. ergosterol, while the refluxing with oxidation is continued for 60–96 hours or more, preferably for 72 hours. The solvents are then removed in vacuo, 17 parts methanol per part of ergosterol is added to the residue and the mixture is allowed to stand at −20° for three hours. It is then filtered from a crystalline by-product. The methanolic filtrate is poured into 20 volumes water, the mixture acidified to pH 3–4, and extracted once with 0.5 volume ether. The ether solution is washed successively with 0.25 volume 7% HCl, water, and saturated bicarbonate solution, and the washings are discarded. The ether is then evaporated in vacuo, and the residue heated just below boiling with 33 parts of 7% methanolic KOH per part of ergosterol for 4 hours. The resulting solution is poured into 10 volumes water, acidified to pH 2–3, and the mixture extracted with 0.5 volume ether. The ether is washed with 0.25 volume 7% HCl and with water, the washings being discarded, and is extracted with 0.3 volume saturated bicarbonate solution. The bicarbonate extract is washed with ether in a continuous extractor until the ether washings are substantially colourless (in one apparatus a turn-over of 3–4 liters of ether per hour could be achieved, and extraction was complete in 5–8 hours). The washed bicarbonate solution is then acidified to pH 1 and extracted with an equal volume of ether. The ether is concentrated to a syrup, and the syrup subjected to a sudden vacuum. A fluffy, reddish-brown mass and some dark resin result from this operation. The light particles are separated mechanically from the resin, and subjected to U. V. irradiation.

For this purpose the product is dissolved in ether to a concentration of 1 mg./ml. in a quartz flask and irradiated with a mercury arc lamp at a distance of 7 cm., at which point a selenium-cell radiation meter read 26 microamperes, while refluxing on a hotplate to achieve thorough mixing. The timing of irradiation is determined by a trial run in which samples are removed at ten minute intervals and asssayed by the method described below. A maximum of activity is usually reached with between 60–70 minutes irradiation.

The potency of my product in imparting or restoring the fatty-acid-aminating power to blood serum (W. Gössl, Wiener Medizinischer Wochenschrift, 100, 660–661 (1950)) may be determined as follows, and this determination used to indicate the optimum conditions of irradiation. A convenient test substrate is horse serum.

Example 2

Normal horse blood is allowed to coagulate, centrifuged, decanted and Seitz-filtered. A portion of the serum is deactivated as to aminating power by extracting 8 times with 0.3 volume of ether. A series of tubes is made up, in duplicate, each containing 2 ml. serum, 2 ml. saline and other materials as indicated; the contents is adjusted to pH 8.2 with barbital buffer:

1. Ether-deactivated serum, urea,[1] fatty acid.[2]
2. Normal serum, urea.[1]
3. Ether-deactivated serum, urea,[1] fatty acid,[2] the product of the present invention.[3]
4. Normal serum, urea,[1] fatty acid.[2]

Tubes 1, 2 and 4 are controls. Tubes 3 are the assay tubes. Tubes 3 and 4 should give substantially equal readings.

The tubes are incubated for 16 hours at 37°, 5 ml. 10% trichloroacetic acid is added, the mixture is filtered, and 3 ml. of the clear filtrate is pipetted into a 40 ml. test tube. The contents are adjusted to pH 6.8–7.0 with successive portions of 1 N, 0.1 N and 0.005 N NaOH against Neutral Red indicator, checking for accuracy on the pH meter from time to time. The total volume should not exceed 8 ml., and the amounts of the various strengths of NaOH are chosen accordingly. Two ml. of a neutralized solution of 36–38% formaldehyde is added. The formaldehyde combines with the amino groups, thus liberating one equivalent of carboxylic acid for each amino group. The carboxylic acid liberated is then titrated with 0.005 N NaOH to pH 8.7–8.9, using phenophthalein as indicator and checking each final result on the pH meter. Each ml. 0.005 N NaOH corresponds to 70 micrograms amino nitrogen.

The difference in ml. 0.005 N NaOH used for control tubes 1 and 2 and for tubes 3 and 4 is a measure of the aminating activity of serum reactivated by my composition (tubes 3) and of normal serum (tubes 4).

[1] Urea is added dissolved in the saline, 1 mg. per tube.
[2] N-butyric acid is added in ether solution (5 mg./ml.), 1 mg. per tube before introducing the serum.
[3] 1.0 microgram of product of present invention.

The results with tubes 3 approximate 100% of the results with tubes 4. For example:

|  | ml. 0.005 N NaOH | Difference | Mcg. amino N |
|---|---|---|---|
| Tubes 1 | 3.6 | | |
| Tubes 2 | 3.5 | | |
| Tubes 3 | 4.7 | +1.1 | 77 |
| Tubes 4 | 4.6 | +1.0 | 70 |

Since normal horse serum will vary somewhat in character, it is advisable with each batch to carry out a series of assays incubated at different pH values to determine in what range maximum reactivation occurs. This will ordinarily be found in the range 8.2–8.6.

My composition is useful as a tool in physiological-chemical research in investigating the aminating power of blood sera, using a technique similar to that described in Example 2.

As will be obvious to those skilled in the art, various changes can be made in my method and various equivalents substituted without departing from the spirit of my invention.

I claim:

1. The method of producing an irradiated oxidation product of ergosterol which comprises: dissolving ergosterol and a small amount of hematoporphyrin in alcohol, refluxing the alcoholic solution for at least 60 hours while passing molecular oxygen through the solution and irradiating the solution with visible light, separating the oxidation product from the alcohol solvent, saponifying the oxidation product with dilute methanolic caustic, removing a resinous by-product from the non-resinous saponified oxidation product, dissolving the latter in ether, and irradiating the ether solution with rays from a quartz mercury-vapor lamp.

2. The method of producing an irradiated oxidation product of ergosterol which comprises: providing a 10 percent solution of ergosterol in alcohol containing 2–20 mg. hematoporphyrin per g. of ergosterol, refluxing the solution for 60–96 hours while passing molecular oxygen through it and irradiating it with visible light, evaporating off the solvent, adding 17 parts methanol to the residue for each part of ergosterol used, storing the methanol solution at a temperature below 0° C. to precipitate a crystalline impurity, filtering off the latter, pouring the filtrate into 20 volumes water, acidifying to pH 3–4 and extracting the acidified solution with ½ volume ether, washing the ether extract successively with small portions of water, dilute HCl and saturated sodium bicarbonate solution, evaporating the ether from the extract and heating the extract with 7% methanolic KOH, diluting and acidifying the resulting solution, extracting it with ether, washing the ether extract with dilute acid and water, extracting it with saturated sodium bicarbonate solution, thoroughly washing the bicarbonate extract with ether, acidifying the washed extract to pH 1, extracting the acidified solution with ether, concentrating the ether solution to a syrup, flash-evaporating the residual ether from the syrup by the sudden application of vacuum, separating the resulting fluffy mass from resin impurity, dissolving the fluffy mass in ether to a concentration of 1 mg. per ml., and irradiating the ether solution in a quartz flask with the rays from a quartz mercury-vapor lamp of an intensity to impart to the irradiated compound in 60–70 minutes potency to restore to ether-deactivated blood serum the power to aminate fatty acids.

No references cited.